United States Patent [19]
Hirota et al.

[11] Patent Number: 5,926,240
[45] Date of Patent: Jul. 20, 1999

[54] LIQUID CRYSTAL DISPLAY APPARATUS COMPRISE A SILICON NITRIDE DIELECTRIC FILM WITH THICKNESS IN A RANGE OF 80MM-170MM AND DISPOSES BETWEEN A REFLECTIVE PIXEL ELECT AND LC LAYER

[75] Inventors: Shoichi Hirota; Hideo Sato, both of Hitachi; Iwao Takemoto, Mobara; Toshio Saito, Hamura, all of Japan

[73] Assignee: Hitachi, Ltd., Tokyo, Japan

[21] Appl. No.: 08/787,050

[22] Filed: Jan. 28, 1997

[30] Foreign Application Priority Data

Jan. 29, 1996 [JP] Japan ..................................... 8-012708

[51] Int. Cl.⁶ ......................... G02F 1/1335; G02F 1/1333
[52] U.S. Cl. ............................... 349/114; 349/8; 349/114; 349/138
[58] Field of Search ..................... 349/5, 8, 114, 349/138

[56] References Cited

U.S. PATENT DOCUMENTS

| 4,185,894 | 1/1980 | Hilotn et al. | 349/114 |
| 5,497,255 | 3/1996 | Yamazaki et al. | 349/116 |
| 5,504,365 | 4/1996 | Yamazaki et al. | 349/114 |
| 5,570,209 | 10/1996 | Usui et al. | 349/5 |
| 5,706,067 | 1/1998 | Colgan et al. | 349/114 |
| 5,724,112 | 3/1998 | Yoshida et al. | 349/117 |

Primary Examiner—William L. Sikes
Assistant Examiner—Julie Ngo
Attorney, Agent, or Firm—Antonelli, Terry, Stout & Kraus, LLP

[57] ABSTRACT

The liquid crystal display apparatus has a pair of substrates. One of the paired substrates includes active matrix elements and reflective pixel electrodes. The other substrate includes a transparent electrode. A liquid crystal layer is provided between the paired substrates, with a single-layer dielectric film disposed between the reflective pixel electrodes and the liquid crystal layer.

15 Claims, 4 Drawing Sheets

WHEN d<<λ

WHEN d>>λ

LIQUID CRYSTAL DISPLAY APPARATUS COMPRISE A SILICON NITRIDE DIELECTRIC FILM WITH THICKNESS IN A RANGE OF 80MM-170MM AND DISPOSES BETWEEN A REFLECTIVE PIXEL ELECT AND LC LAYER

BACKGROUND OF THE INVENTION

A liquid crystal display apparatus using a conventional liquid crystal display device is described, for example, in Japan Patent Laid-Open No. 178625/1992 and 338721/1992.

FIG. 7 is a cross section showing an example of the structure of a conventional liquid crystal display device. In the liquid crystal display device, the voltage from an active matrix element 18 is applied to a pixel electrode 32. To separate the pixel electrodes 32 and the liquid crystal layer 9, there are provided a dielectric layer 33 and a dielectric mirror 34 between the pixel electrodes 32 and the liquid crystal layer 9. The dielectric mirror 34 is formed of multiple dielectric films. Separating the pixel electrodes 32 and the liquid crystal layer 9 in this way alleviates limitations on the material that can be used for the pixel electrodes 32.

Generally, when the pixel electrodes of the liquid crystal display device are made of a metal to form a reflection surface, there is a problem that the metal surface is prone to corrode at an interface where it is in direct contact with the liquid crystal, degrading the reflectivity of the pixel electrodes. The corrosion also causes deterioration of the liquid crystal, leading to variations in in-plane brightness and color.

To eliminate these problems, it has been suggested to use the dielectric mirror 34 as a reflection surface, as in the conventional technique mentioned above, instead of using metallic pixel electrodes as a reflection surface, and to separate spatially the pixel electrodes 32 and the liquid crystal layer 9. The dielectric mirror 34 is formed as a multilayer film comprising thin films of materials with different refractive indices, such as titanium dioxide and silicon dioxide, stacked alternately one upon the other. As the number of such multilayer films is increased, the reflectivity of the dielectric mirror 34 increases. The increase in the number of multilayer films, however, results in a reduction in an electric capacity.

Light that has leaked through the dielectric mirror 34 is absorbed by a dielectric layer 33, formed flat layer between the dielectric mirror 34 and the pixel electrodes 32, which layer has high visual light absorptivity.

In the conventional technique, as described above, because the dielectric mirror 34 is disposed between the liquid crystal layer 9 and the dielectric layer 33, which is formed over the pixel electrodes 32, the voltage applied between the pixel electrodes 32 and the opposing transparent electrodes 10 through the liquid crystal layer 9 is also shared by the dielectric mirror 34. This reduces the effective voltage applied to the liquid crystal layer 9, making it difficult to drive the liquid crystal display device.

Further, when light leaking through gaps between the pixel electrodes 32 is incident on the circuit of the active matrix element 18, a charge flows out of a storage capacitor therein, causing a photo-activated current leakage. The reflection by the dielectric mirror 34 that prevents this photo-activated current leakage and the undesirable reduction in the effective application voltage to the liquid crystal layer 9 are in a trade-off relationship.

The above conventional technique, however, did not consider this trade-off relationship. In addition, the process of fabricating the dielectric multilayer film is complex, increasing the cost of the liquid crystal display device. Although a protective film is needed to effect spatial separation between the reflective pixel electrodes and the liquid crystal layer, the reduction in the reflectivity of the reflective pixel electrodes caused by this protective film must be avoided.

SUMMARY OF THE INVENTION

The object of this invention is to provide a liquid crystal display device, which has a means that prevents a reduction in capacitance due to photo-activated current leakage and a reduction in reflectivity caused by corrosion of the pixel electrodes.

The liquid crystal display device of this invention comprises a liquid crystal layer; a plurality of separate reflective pixel electrodes; an active matrix element for applying a driving voltage to the liquid crystal layer through the reflective pixel electrodes; a transparent substrate formed with a transparent electrode facing the reflective pixel electrodes; and a single-layer dielectric film disposed between the reflective pixel electrodes and the liquid crystal layer.

The thickness of the dielectric film should preferably be determined by taking a product, for each wavelength, of a luminosity curve and a reflection spectrum of the reflective pixel electrodes deposited with the liquid crystal layer and the dielectric film, integrating the product over an entire wavelength range of incident light on the liquid crystal display device to determine the reflectivity of white light, changing the thickness of the dielectric film to determine a dielectric film thickness dependency of the reflectivity of the white light, and setting the thickness of the dielectric film to maximize the reflection of white light.

The thickness of the directric film preferably corresponds to a first peak of the reflection of white light obtained when the film thickness is increased from zero. Further, when the dielectric film is a silicon nitride film, its thickness preferably ranges from 80 nm to 170 nm and optimumly 125 nm.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENT

Figure 1:
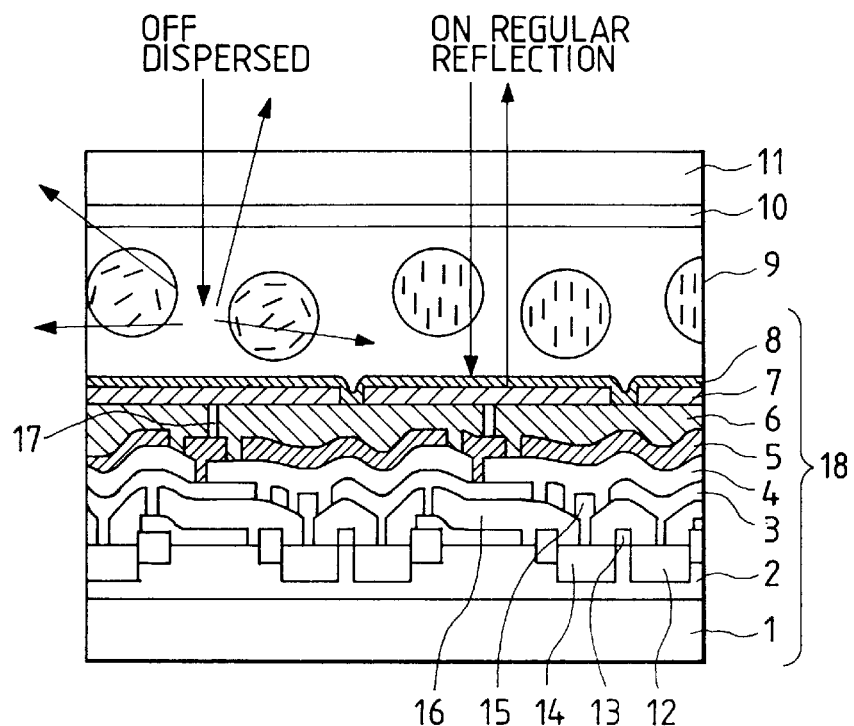
FIG. 1 is a cross section showing the structure of one embodiment of a liquid crystal display device of the present invention.

With this invention, because the reflective pixel electrodes 7 and the liquid crystal layer 9 are spatially separated by a single dielectric film 8, as shown in FIG. 1, reductions in the reflectivity of the reflective pixel electrodes 7 and degradations of the characteristic of the liquid crystal layer 9 which would otherwise result from corrosion of the reflective pixel electrodes 7, when the reflective pixel electrodes 7 are in contact with the liquid crystal layer 9, will not occur, thus enhancing the reliability of the liquid crystal display device.

When the liquid crystal display device is used as an image display element, it is desirable for the element have good reflection characteristics in the visible light wavelength range. Hence, in this embodiment, the thickness d of the dielectric film 8 is set such that the reflectivity of white light, determined from a combination of the wavelength distribution of incident light intensity, the reflectivity of each wavelength and the specific luminosity factor of human eye, becomes highest.

Now, the process of determining the appropriate film thickness d of the dielectric film 8 will be explained. Let the refractive index of the liquid crystal be n1, the refractive index of dielectric film 8 be n2, the complex refractive index of the reflective pixel electrode 7 be n3, and the extinction coefficient be k3. If we let $n^{\wedge}_3 = n_3 + ik_3$, then the reflectivity R of the liquid crystal display device for the illuminated light, which is incident vertically on the reflective pixel electrodes 7, can be expressed as follows, with λ representing the wavelength. Parameters are as shown in Equation 2 to 5. From Equation 1 to Equation 5, the wavelength dependency of the reflectivity of the liquid crystal display device is determined.

$$R(\lambda) = \frac{r_{12}^2 + p_{23}^2 + 2r_{12}p_{23}\cos(\phi_{23} + 2\beta)}{1 + r_{12}^2 + p_{23}^2 + 2r_{12}p_{23}\cos(\phi_{23} + 2\beta)} \quad (1)$$

$$r_{12} = \frac{n_1 - n_2}{n_1 + n_2} \quad (2)$$

$$p_{23} = \left(\frac{(n_2 - n_3)^2 + k_3^2}{(n_2 + n_3)^2 + k_3^2}\right)^{1/2} \quad (3)$$

$$\tan\phi_{23} = \frac{2k_3 n_2}{n_3^2 + k_3^2 - n_2^2} \quad (4)$$

$$\beta = \frac{2\pi}{\lambda} n_2 d \quad (5)$$

Figure 2:
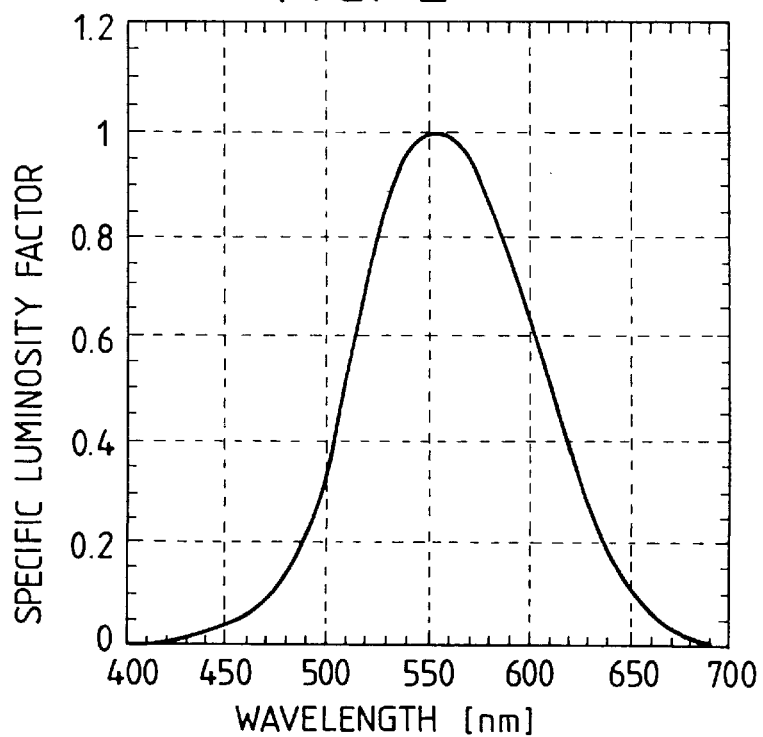
FIG. 2 is a characteristic diagram showing a specific luminosity factor of the human eye.

Further, using the human eye's specific luminosity factor characteristic curve V(λ) and the wavelength distribution of incident light intensity I(λ) shown in FIG. 2, the Equation (6) provides the dielectric film 8 thickness dependency Ra(d) of the reflectivity of the liquid crystal display device for white light. G in the equation means performing an integration over the whole wavelength region of the incident light on the liquid crystal display device.

$$R_a(d) = \frac{f_G R(\lambda) V(\lambda) I(\lambda) d\lambda}{f_G V(\lambda) I(\lambda) d\lambda} \quad (6)$$

As the thickness d of the dielectric film 8 is increased from 0 nm, the reflectivity Ra(d) for white light decreases because of interference between the reflected light from the boundary surface of the dielectric film 8 and the liquid crystal layer 9 and the reflected light from the boundary surface of the dielectric film 8 and the reflective pixel electrodes 7. As the film thickness is further increased, the reflectivity will increase and reach its relative maximum. When the film thickness d is further increased, the reflectivity Ra(d) for white light decreases. But the reflectivity Ra(d) rises again if the film thickness d is further increased. In this way, as the thickness d of the dielectric film 8 increases, the reflectivity Ra(d) for white light repeatedly increases and decreases.

The term contributing to the interference is a cosine term in Equation 1 and more specifically β in Equation 5. The wavelength λ range of the visible light is approximately from 380 nm to 700 nm, i.e., 380 nm<λ<700 nm. The refractive index n2 of the dielectric film 8 is around 1.5 to 2.0.

Figure 3A:
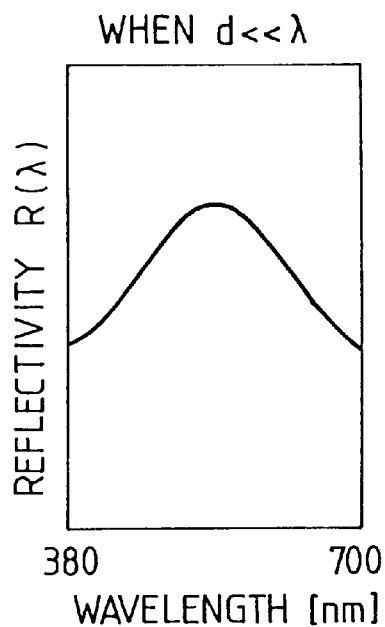
FIGS. 3A and 3B are characteristic showing the wavelength dependency of the reflectivity R($\lambda$) when the relation between the wavelength $\lambda$ of incident light and the thickness d of the dielectric film is changed.
Figure 3B:
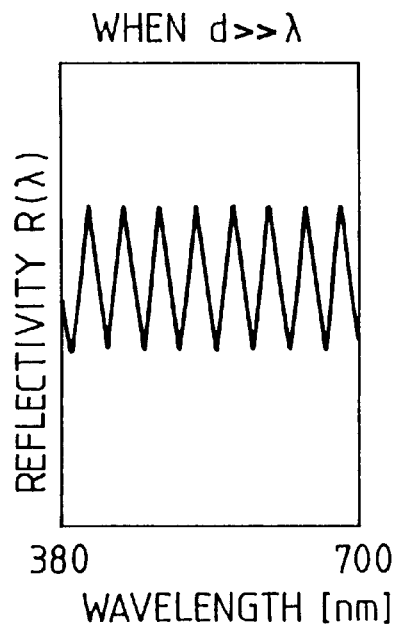

Hence, when d<λ, the variation range Δβ is 2* or less. As shown in FIG. 3A, the wavelength interval at which the reflectivity R(β) increases and decreases is almost equal to the wavelength width in the visible light range. The reflectivity Ra(d) for white light can be enhanced by matching the relative maximum wavelength of the reflectivity R(λ) with the relative maximum wavelength of the specific luminosity factor curve. When d>λ, then Δβ>2π·n₂. A slight change in the wavelength results in a large change in the cosine term of Equation 1, which means that the wavelength interval at which the reflectivity R(λ) repeatedly increases and decreases narrows and, as shown in FIG. 3B, the reflectivity R(λ) fluctuates a large number of times in the visible light range.

Thus, the reflectivity Ra(d) of white light, which is found by taking the product of the spectrum of the reflectivity R(λ) and the specific luminosity factor curve (FIG. 2) for each wavelength and integrating the product over the entire wavelength range of the incident light on the liquid crystal display device, is averaged at the center value of the amplitude and approaches the reflectivity in a case in which the thickness of the dielectric film 8 is sufficiently greater than the wavelength of the incident light. That is, the amplitude of the increase and decrease of the reflectivity Ra(d) of white light decreases as the thickness d of the dielectric film 8 increases.

The appropriate thickness of the protective film is normally several tens of nanometers or larger. In this thickness range, when the reflectivity Ra(d) of white light is higher than the reflectivity in a case in which the thickness d of the dielectric film 8 is sufficiently larger than the wavelength of the incident light, the film thickness d falls in a range that will make the reflectivity Ra(d) of white light the relative maximum.

As the film thickness d is increased from 0, the first-appearing peak (first peak) of reflectivity exhibits, because of the effect of interference, a value almost equal to the reflectivity of white light in a case in which the dielectric film 8 is not applied. Thus, the film thickness d corresponding to the first peak of reflectivity is most appropriate as the thickness of the dielectric film 8.

Because the dielectric film 8 is a single-layer film, the structure is simple, thereby allowing the liquid crystal display device to be manufactured easily and inexpensively. Further, because the thickness of the dielectric film 8 is about equal to the wavelength of the incident light, i.e., sufficiently thinner than the liquid crystal layer 9, the reduction in the liquid crystal drive voltage caused by the capacitance sharing by the dielectric film 8 is limited.

Next, by referring to FIG. 1 to 6, one embodiment of the liquid crystal display device of this invention and the liquid crystal display apparatus using the liquid crystal display devices will be described.

FIG. 1 is a cross section showing the structure of one embodiment of the liquid crystal display device of this invention. The liquid crystal display device of this embodiment has a construction, in which a monolithic integrated circuit substrate formed with active matrix elements 18 is used as a reflective substrate and a polymer dispersed liquid crystal 9 is interposed between the reflective substrate and a glass substrate 11 having a transparent electrode 10. The polymer dispersed liquid crystal 9, when not applied with a voltage, is in a scattered random state. As the applied voltage increases, the random state decreases transforming the liquid crystal into a transparent state. The polymer dispersed liquid crystal 9 does not require a polarizing film and an alignment layer and thus has a good light utilization factor.

The reflective substrate has MOS (metal oxide semiconductor) transistors formed as liquid crystal driving active elements on a silicon substrate 1. That is, the MOS transistor formed on a p-type well 2 of the silicon substrate 1 includes a source diffusion region 12, a source electrode 3, a drain diffusion region 14, a drain electrode 15 and a polysilicon gate 13. A first spin-on-glass insulation layer 16 is also provided for interlayer insulation. Further, a light shielding interconnect layer 5 is provided through a second spin-on-glass insulation layer 4 to prevent light from entering into the MOS transistor layer.

The reflective pixel electrodes 7 are preferably made of a metal with good reflectivity in the visible light range, particularly aluminum and silver. Here, we will describe a case in which aluminum is used for the reflective pixel electrodes 7.

The reflective pixel electrodes 7 should preferably be formed on a flat surface to obtain a stable film and provide a good reflection characteristic. It is desirable for a silicon oxide layer 6 provided as an underlayer of the reflective pixel electrodes 7 to be made flat by surface-polishing.

An electric signal controlled by the MOS transistor is supplied through a through-hole contact 17 to a reflective pixel electrode 7, thereby applying a drive voltage to the polymer dispersed liquid crystal 9 interposed between the reflective pixel electrode 7 and the opposing transparent electrode 10.

The dielectric film 8 provided as a passivation layer between the reflective pixel electrodes 7 and the polymer dispersed liquid crystal 9 is required to have a good insulation characteristic, a good transmission characteristic in the visible light range and a large dielectric constant and also to be able to be formed easily.

One of the materials that meet these requirements is silicon nitride. Silicon nitride does not absorb light in the visible light range and exhibits a very good transmission characteristic. It also has a high dielectric constant of about 9, which is almost equal to the dielectric constant of the polymer dispersed liquid crystal 9. Further, the silicon nitride film has a small water permeability compared to that of a silicon oxide film and thus is an appropriate material as the passivation layer for the reflective pixel electrodes 7.

Methods of forming the dielectric film 8 include a plasma chemical vapor deposition, an electron cyclotron resonance CVD and a sputtering.

Although this embodiment uses the plasma CVD method, the silicon nitride film 8 with a similar characteristic can also be formed using the other two methods.

Figure 4:
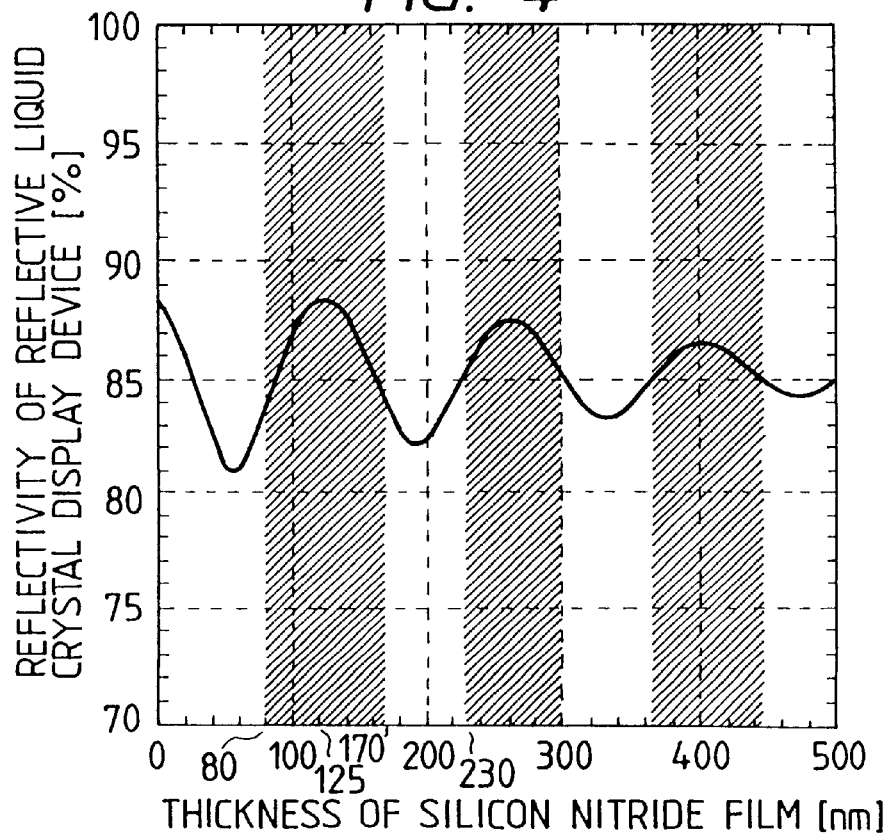
FIG. 4 is a characteristic diagram showing the dielectric film thickness dependency of the reflectivity of the liquid crystal display device when aluminum is used for the reflective pixel electrodes and silicon nitride is used for the dielectric film.

FIG. 4 shows calculated values of silicon nitride film thickness dependency of the white light reflectivity considering the specific luminosity factor in the liquid crystal display device of this embodiment that uses silicon nitride as the material of the dielectric film 8. Here, aluminum is used for the reflective pixel electrodes 7 and the refractive index of the liquid crystal is assumed to be 1.5.

FIG. 4 shows that the reflectivity fluctuates as the film thickness increases. The film thickness that assumes a peak value of reflectivity can be roughly explained by a formula $nd = m \lambda/2$ where m is a natural number, n is the refractive index of silicon nitride, d is the thickness of the silicon nitride film and $\lambda$ is the wavelength of the incident light. As already explained regarding the means for solving the problems, the reflectivity of the liquid crystal display device needs to be optimized by considering the specific luminosity factor. If the complex refractive index of aluminum has any wavelength dependency, the film thickness corresponding to the peak value of reflectivity differs from the film thickness determined by $nd = m \lambda/2$.

The peak value of reflectivity decreases with an increasing thickness of the silicon nitride film and approaches a constant value of about 85%.

Under the condition that the thickness d of the silicon nitride is sufficiently small, the range of the film thickness d that produces a reflectivity larger than the constant value of 85%, i.e., peak reflectivity, is determined to be from 80 nm to 170 nm for the first peak of reflectivity and from 230 nm to 300 nm for the second maximum.

Although the thickness range of 0 nm to 30 nm also provides reflectivity higher than 85%, it is difficult to form a uniform film in this thickness range, which is therefore determined as being outside of the thickness range where the dielectric film 8 can work as a passivation film and is excluded from the high reflectivity producing film thickness range.

Considering the fact that, as the thickness d of the silicon nitride film further increases, the peak value of reflectivity decreases and the voltage applied to the liquid crystal decreases because of shared capacitance, and that the refractive index of the silicon nitride film changes according to the film making conditions, the desirable film thickness d is determined to fall in a range from 80 nm to 170 nm. The film thickness of 125 nm, which corresponds to the peak reflectivity for white light, in particular, is the most appropriate thickness.

Next, let us consider the effect that the capacitance sharing by the dielectric film 8 has on the voltage applied to the liquid crystal. As mentioned earlier, the dielectric constant of silicon nitride is about 9, which is nearly equal to the dielectric constant of the polymer dispersed liquid crystal 9. The thickness of the typical liquid crystal layer 9 is approximately 10 $\mu$m. Thus, a reduction in the applied voltage to the liquid crystal caused by the capacitance sharing by the silicon nitride is 1% at most and its influence on the display characteristic of the liquid crystal display device is very small.

When a potential difference occurs between the voltage of the opposing electrodes and the center voltage of the pixel electrodes that reverses every frame, a dc voltage is applied to the liquid crystal, causing brightness variations among frames or so-called flickers.

The dielectric film 8 has a good insulation performance and a large capacitance of about 100 times that of the liquid crystal 9, and therefore functions as a dc component cutoff capacitor to prevent application of the dc voltage to the liquid crystal 9. Hence, the dielectric film 8 can prevent flicker, which is synchronous with half the frame frequency.

Figure 5:
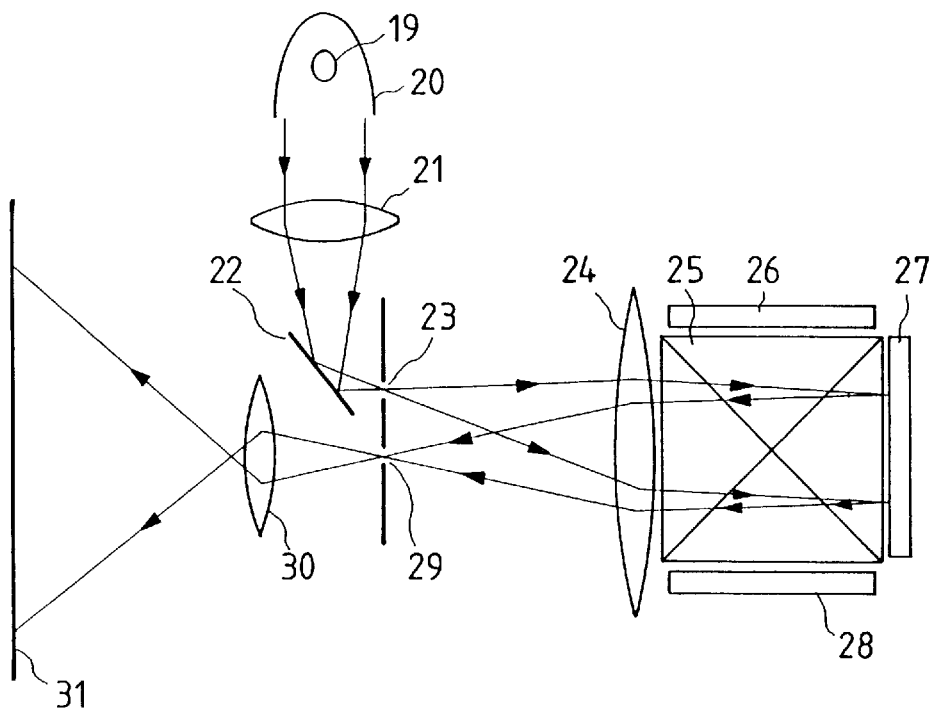
FIG. 5 is a schematic diagram showing the configuration of one embodiment of a liquid crystal display apparatus using the liquid crystal display device of the present invention.
Figure 7:
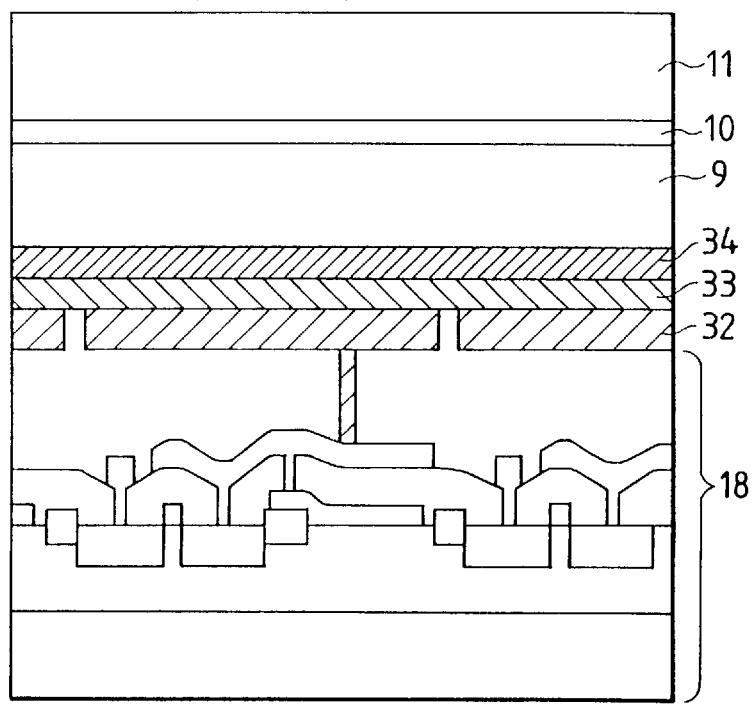
FIG. 7 is a cross section showing an example of the structure of a conventional liquid crystal display device.

FIG. 5 is a block diagram showing the configuration of one embodiment of a projection type liquid crystal display apparatus using the liquid crystal display device of this invention. In this liquid crystal display apparatus, the light emitted from a light source 19 is collimated by a paraboloidal mirror 20 into a parallel beam, which is then passed through a condenser lens 21, a mirror 22, a first iris 23 and a lens 24 into a dichroic prism 25. The dichroic prism 25 separates the incident light into three primary colors, red, blue and green, and outputs them. Three side surfaces of the dichroic prism 25 are mounted with a liquid crystal display device 26 for red, a liquid crystal display device 27 for green and a liquid crystal display device 28 for blue to modulate the separated light beams of the corresponding colors according to video signals. The modulated reflected light beams of the three primary colors are combined again by the dichroic prism 25 and the combined beam is further passed through a lens 24, a second iris 29 and a projection lens 30 onto a screen 31.

At this time, the three liquid crystal display devices 26, 27, 28 assume either a scattering state or a reflecting state for each pixel according the video signals. The regular reflection beams are focused by the lens 24 onto the second iris 29 and pass through it and the projection lens 30 to reach the screen 31. The major part of the scattered beams is not focused on the second iris 29, but is shielded, thereby failing to reach the screen 31.

According to the scattering state or reflecting state of the three liquid crystal display devices 26, 27, 28, dark or bright states are produced on the screen 31 for each color, thus projecting a color image.

As detailed below, if the thicknesses of the dielectric films in the liquid crystal display device 26 for red, liquid crystal display device 27 for green and liquid crystal display device 28 for blue are optimized according to the wavelength range and the specific luminosity factor of the incident light on each liquid crystal display device, the reflectivity of each liquid crystal display device is further enhanced, improving the brightness of the projection type liquid crystal display apparatus.

Here, we will describe an example in which aluminum is used for the reflective pixel electrodes 7 and silicon nitride is used for the dielectric film 8. The wavelength range of incident light on the liquid crystal display device 26 for red is assumed to be 580 nm or longer; the wavelength range of incident light on the liquid crystal display device 27 for green is assumed to be 490 nm to 580 nm; and the wavelength range of incident light on the liquid crystal display device 28 for blue is assumed to be 490 nm or shorter.

Figure 6:
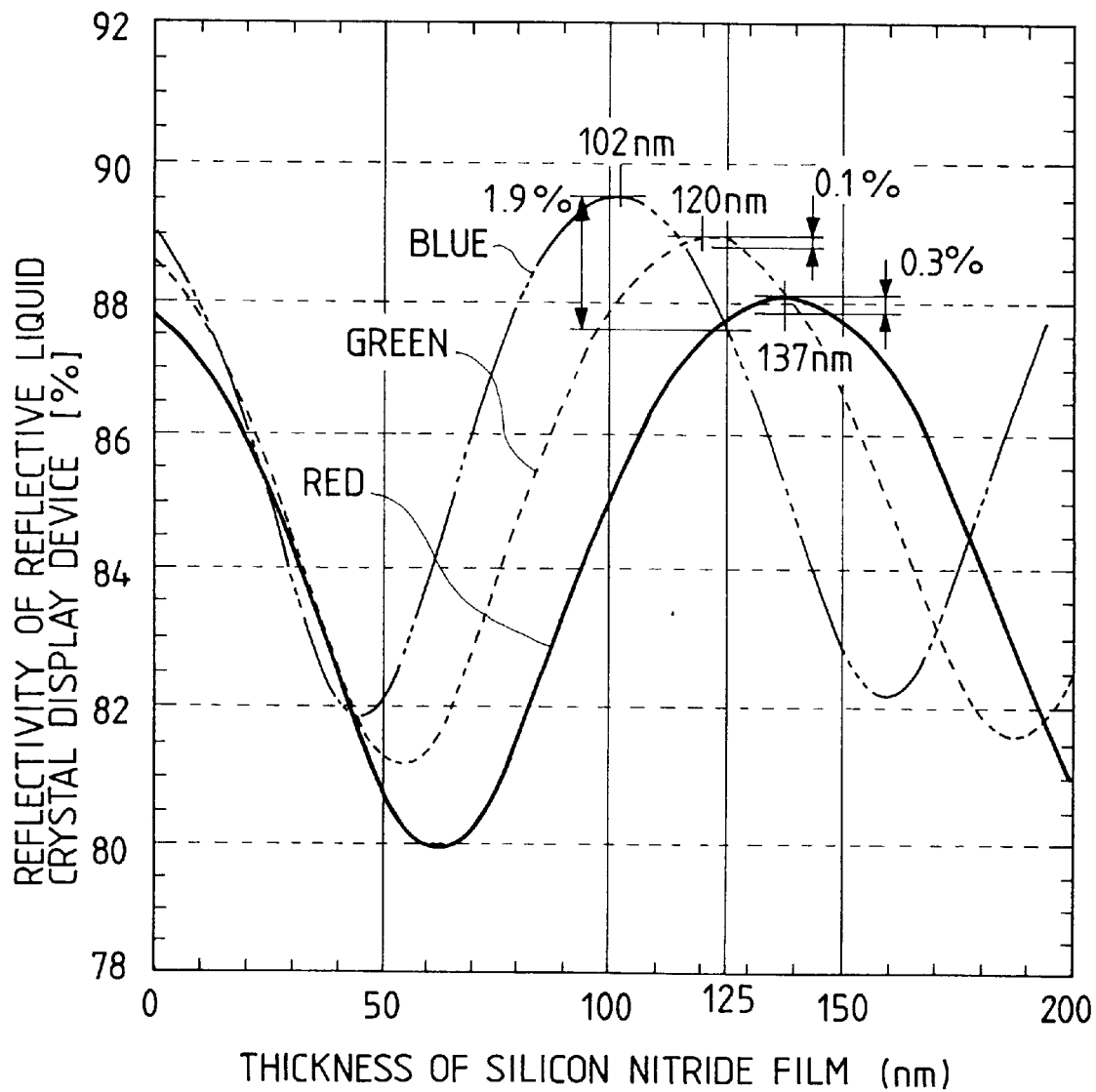
FIG. 6 is a characteristic diagram showing the dielectric film thickness dependency of the reflectivity of the liquid crystal display device when aluminum is used for the reflective pixel electrodes and silicon nitride for the dielectric film, with a wavelength range of the incident light of 580 nm or higher used as red, 490–580 nm as green and 490 nm or lower as blue.

FIG. 6 is a characteristic diagram showing the reflectivity R(d) calculated for each wavelength range. In the liquid crystal display device of FIG. 4, a comparison between the peak of reflectivity and the reflectivity in a case in which the optimum thickness of the silicon nitride for the visible region is 125 nm has found that setting the thickness of the silicon nitride of the liquid crystal display device 26 for red to 137 nm increases the reflectivity by 0.3%, that setting the thickness of the liquid crystal display device 27 for green to 120 nm increases the reflectivity by 0.1%, and that setting the thickness of the liquid crystal display device 28 for blue to 102 nm increases the reflectivity by 1.9%, thus improving the brightness of the projection type liquid crystal display apparatus.

In summary, this invention forms a single-layer dielectric film between the reflective pixel electrodes and the liquid crystal layer and determines the thickness of the single-layer dielectric film according to the optical constant of the material of the reflective electrodes, the optical constant of the single-layer dielectric film and the specific luminosity factor. This prevents degradation of the pixel electrodes, such as corrosion, without impairing their reflectivity.

Further, because the thickness of the dielectric film is sufficiently smaller than that of the liquid crystal layer, a reduction in the liquid crystal drive voltage due to capacitance sharing by the dielectric film is small.

Furthermore, because the dielectric film is made of a single layer, its structure is simple, allowing for an easy and inexpensive manufacture of the liquid crystal display device.

What is claimed is:

1. A liquid crystal display device comprising:
   a liquid crystal layer;
   a plurality of separate reflective pixel electrodes;
   active matrix element for applying a driving voltage to the liquid crystal layer through the reflective pixel electrodes;
   a transparent substrate with a transparent electrode facing the reflective pixel electrodes; and
   a single-layer dielectric film disposed between the reflective pixel electrodes and the liquid crystal layer.

2. A liquid crystal display device according to claim 1, wherein the dielectric film is a silicon nitride film, and the thickness of the silicon nitride film is in the range from 80 nm to 170 nm.

3. A liquid crystal display device according to claim 1, wherein the dielectric film is a silicon nitride film, and the thickness of the silicon nitride film is 125 nm.

4. A liquid crystal display device according to claim 1, wherein the single-layer dielectric film has a thickness at which reflectivity of white light is a relative maximum, the thickness of the single-layer dielectric film being determined by multiplying values on a luminosity curve and a reflection spectrum of the reflective pixel electrodes composed of the liquid crystal layer and the single-layer dielectric film to produce product values for each wavelength, integrating the product values over an entire wavelength range of the incident light on the liquid crystal display device to determine a reflectivity of the white light, and varying the thickness of the single-layer dielectric film to determine the thickness dependency of the single-layer dielectric film for the reflectivity of the white light with the thickness of the single-layer dielectric film being set so that the reflectivity of the white light is at the relative maximum.

5. A liquid crystal display device according to claim 1, wherein the single-layer dielectric film has a thickness at which a first peak reflectivity of white light is obtained when the thickness of the single layer dielectric film is increasingly varied from zero.

6. A liquid crystal display device according to claim 1, wherein the single-layer dielectric film is a dielectric mirror.

7. A liquid crystal display apparatus comprising:
   a light source emitting white light;
   a color separating element for separating the white light into three primary colors, red, green and blue;

a plurality of liquid crystal display devices having disposed between reflective pixel electrodes and a liquid crystal layer a single-layer dielectric film whose thickness is so set as to maximize the reflectivity of the white light, the liquid crystal display devices being adapted to modulate each of the separated primary color light to produce image information; and a projecting lens system for projecting the modulated light onto a screen.

8. A liquid crystal display apparatus comprising:

a light source emitting white light;

a color separating element for separating the white light into three primary colors, red, green and blue;

a plurality of liquid crystal display devices having disposed between reflective pixel electrodes and a liquid crystal layer a single-layer dielectric film whose thickness is so set as to maximize the reflectivity of each primary color light, the liquid crystal display devices being adapted to modulate each of the separated primary color light to produce image information; and a projecting lens system for projecting the modulated light onto a screen.

9. A liquid crystal display device comprising:

a liquid crystal layer;

a plurality of separate reflective pixel electrodes;

an active matrix element for applying a driving voltage to the liquid crystal layer through the reflective pixel electrode;

a transparent substrate with a transparent electrode facing the reflective pixel electrodes;

a dielectric film disposed between the reflective pixel electrodes and the liquid crystal layer;

wherein the dielectric film has a thickness at which a reflectivity of white light is a relative maximum, the thickness of the dielectric film being determined by multiplying values on a luminosity curve and a reflection spectrum of the reflective pixel electrodes composed of the liquid crystal layer and the dielectric film to produce product values for each wavelength, integrating the product values over an entire wavelength range of the incident light on the liquid crystal display device to determine a reflectivity of the white light, and varying the thickness of the dielectric film to determine the thickness dependency of the dielectric film for the reflectivity of the white light and the thickness of the dielectric film is set so that the reflectivity of the white light is at the relative maximum.

10. A liquid crystal display device according to claim 9, wherein the dielectric film is a dielectric mirror.

11. A liquid crystal display device according to claim 9, wherein the liquid crystal layer is disposed between the reflective pixel electrodes and the transparent substrate with the transparent electrode facing the reflective pixel electrodes.

12. A liquid crystal display device comprising:

a liquid crystal layer;

a plurality of separate reflective pixel electrodes;

an active matrix element for applying a driving voltage to the liquid crystal layer through the reflective pixel electrodes;

a transparent substrate with a transparent electrode facing the reflective pixel electrodes so that the liquid crystal layer is disposed between the transparent substrate and the reflective pixel electrode;

a dielectric film disposed between the reflective pixel electrodes and the liquid crystal layer;

a light shielding interconnect layer; and a surface-polished flat underlayer of the reflective pixel electrodes disposed between the reflective pixel electrodes and the light shielding interconnect layer.

13. A liquid crystal display device according to claim 12, wherein the dielectric film is composed of at least a silicon nitride film.

14. A liquid crystal display device according to claim 12, wherein the active matrix element is provided on a substrate having the light shielding interconnect layer, the surfaced-polished flat underlayer, the reflective pixel electrodes and the dielectric film disposed thereon.

15. A liquid crystal display device according to claim 12, wherein the dielectric film is a dielectric mirror.

* * * * *